No. 871,832. PATENTED NOV. 26, 1907.
F. C. H. STRASBURGER.
BEER RECLAIMING MACHINE.
APPLICATION FILED JAN. 8, 1906.
2 SHEETS—SHEET 2.
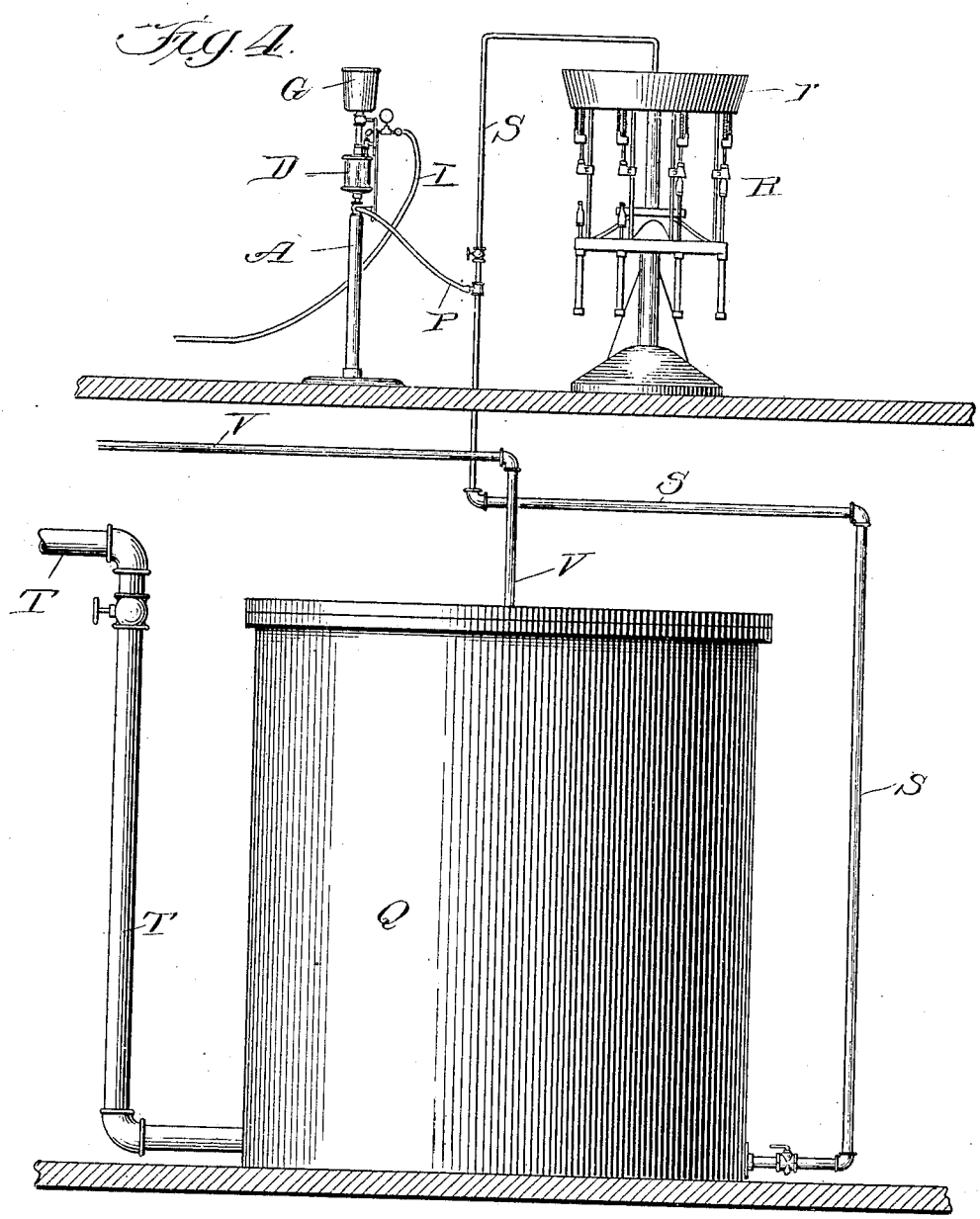

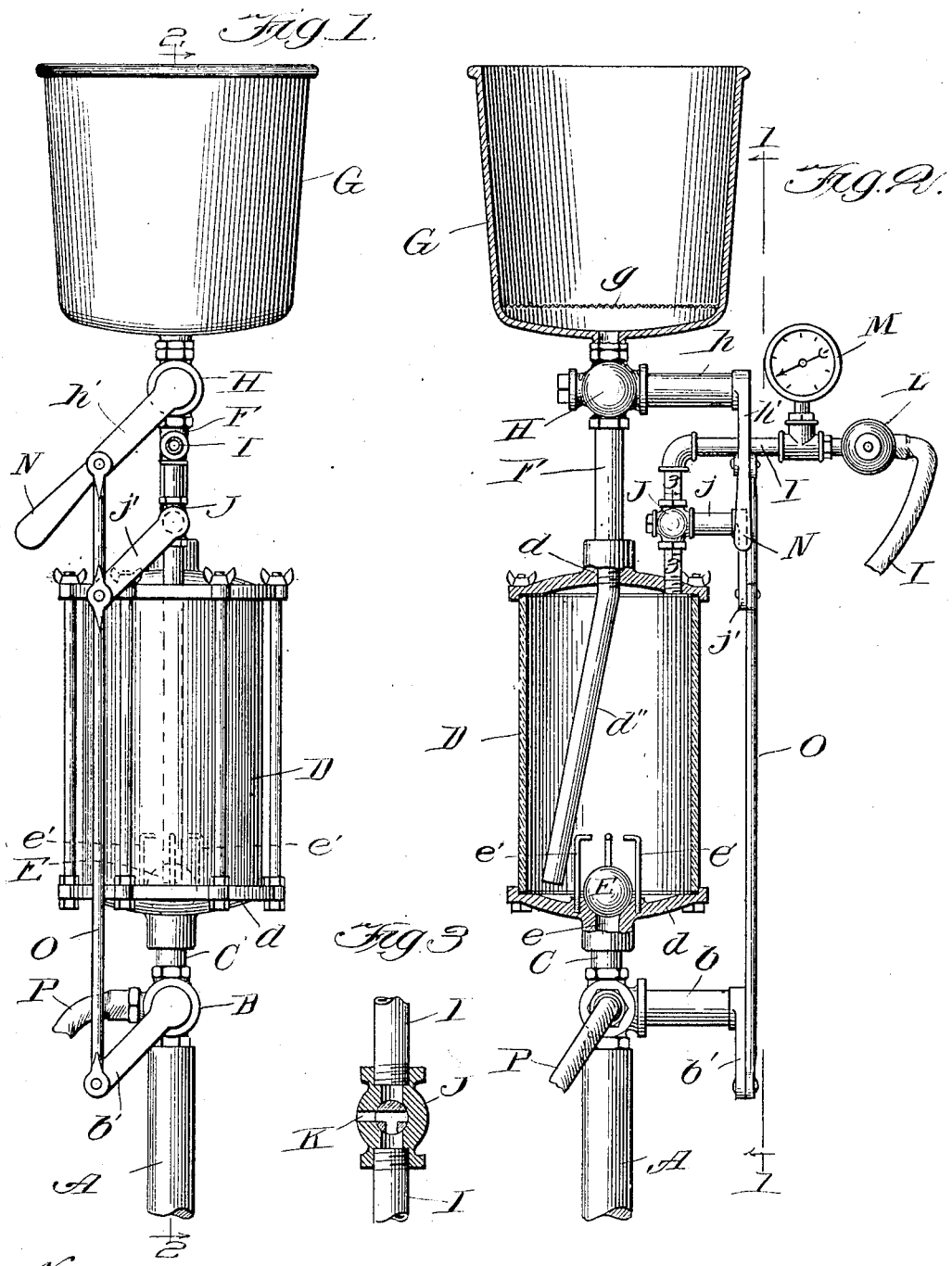

UNITED STATES PATENT OFFICE.

FRANK C. H. STRASBURGER, OF CHICAGO, ILLINOIS, ASSIGNOR TO BOTTLERS MACHINERY MANUFACTURING COMPANY, OF CHICAGO, ILLINOIS, A CORPORATION OF ILLINOIS.

BEER-RECLAIMING MACHINE.

No. 871,832.      Specification of Letters Patent.      Patented Nov. 26, 1907.

Application filed January 8, 1906. Serial No. 294,980.

*To all whom it may concern:*

Be it known that I, FRANK C. H. STRASBURGER, a citizen of the United States, residing at Chicago, in the county of Cook and State of Illinois, have invented new and useful Improvements in Beer-Reclaiming Machines, of which the following is a specification.

In bottling shops where the filling operation is conducted under pressure in a system which comprises a filling machine connected with a supply vat, it happens with more or less frequency that a bottle will be broken or found to be defective during the filling operation and it has been the custom heretofore to throw the filled or partly filled bottle away and waste the beer.

The object of this invention is to save this beer and return it to the bottling system, either to the filling machine or to the beer supply.

In the accompanying drawings I have illustrated a machine embodying the invention in one form, and referring thereto Figure 1 is a sectional view on the line 1—1 of Fig. 2. Fig. 2 is a sectional view on the line 2—2 of Fig. 1. Fig. 3 is a sectional view on the line 3—3 of Fig. 2. Fig. 4 shows the reclaiming machine embodied in the bottling system.

The machine comprises a standard A which is mounted on a base of any suitable construction. A two-way vavle B is mounted on the standard A and is connected by a pipe C with the bottom *d* of a pressure chamber D. A ball valve E is arranged to seat at the upper end of a discharge passage *e* in the bottom of the pressure chamber and this ball valve is held in place by the guide arms *e'*. The pressure chamber is provided with an inlet passage *d'* in its top and a filling tube *d''* extending down close to its bottom. The passage *d'* is connected by a pipe F with the bottom of a superposed receiving tank G. A two-way valve H is located in the pipe F. An air pipe I is connected to the top of the pressure chamber and is provided with a three-way valve J having in its casing a port K to exhaust to the atmosphere (Fig. 3).
This air pipe is also provided with a reducing valve L and a pressure gage M. The stem *b* of valve B, the stem *j* of valve J and the stem *h* of valve H are extended and carry the crank levers *b'*, *j'* and *h'* respectively, and one of these levers, preferably the lever *h'*, is prolonged to form a handle N. The levers *b'*, *j'* and *h'* are pivotally connected by a rod O so that they will all be operated simultaneously. The air pipe I is connected to a source of air supply and the delivery pipe P leading from the valve B may be connected to the head of the pressure filling machine, to the supply pipe therefor, or to the source of beer supply. A fine sieve *g* is removably arranged in the bottom of the receiving tank G.

In practice the machine is preferably located adjacent to the filling machine so that when the bottle is broken or found to be defective during the filling operation it can be emptied by the operator or an assistant into the receiving tank.

In Fig. 4 I have shown the machine embodied in a bottling system which comprises the beer supply vat Q, a rotary filling machine R, a beer pipe S connected to the bottom of the vat and discharging into the head or tank *r* of the filling machine, a beer supply pipe T, and an air pipe V connected to the vat. Any number of these vat may be connected in series but one will be sufficient to illustrate the invention. In this system I have shown the delivery pipe P connected to the filling machine supply pipe S but, as heretofore mentioned, it might be connected directly to the head or to the vat in order to deliver the reclaimed beer, which has become more or less flat or stale, into the live beer in the system. The reducing valve will be set to provide for a sufficient pressure on the beer in the chamber D to deliver it into the bottling system against the pressure therein.

In the drawings I have shown the machine as it stands at the beginning of the filling operation, the valve B being closed, the ball valve E seated, the valve H open and the valve J closed except that the exhaust port K is open. When beer is poured into the receiving tank it will be strained through the sieve *g* and flow down through the open valve H and the pipe F into the pressure chamber D. The beer in the pressure chamber will unseat the ball valve but as the valve B is closed the beer can not escape. As the beer flows into the pressure chamber the air therein will escape through the exhaust port K. When the pressure chamber is filled, or, in fact, at any time, the handle lever N is operated to simultaneously close the valve H and open the valve B and the valve J, and as the latter valve is opened the exhaust port K will be closed. This admits the air pressure into the pressure chamber to force the beer therein out through the valve B into the delivery pipe P and thence to the filling machine supply pipe or to any other desired point of delivery. After the beer has been discharged from the pressure chamber the handle lever N is again operated to restore the valves to their initial positions in which the valve B is closed, the valve E seated, the valve H open and the valve J closed except that the exhaust port K is open to permit the escape of air from the pressure chamber as the beer flows therein.

The machine is simple in construction, easy to operate and will not be ordinarily affected or put out of order by the rough usage to which bottling machinery is generally subjected. The valves are all operated simultaneously and the ball valve effectually avoids the escape of pressure from the pressure chamber into the delivery pipe by seating as soon as the beer is discharged from the pressure chamber. All the beer which has formerly been thrown away with broken or defective bottles may be saved and returned to the filling machine or the source of supply and in some shops this represents a large saving where the filling is done on an extensive scale.

While I have described the machine as used in connection with a pressure filling machine for bottling beer it can be used in connection with an open filler and for bottling any liquid.

What I claim and desire to secure by Letters Patent is:

1. The combination of a pressure bottling system comprising a liquid supply vat, a filling machine, a pipe connecting the vat to the filling machine, a tank for receiving waste liquid from broken and defective bottles, a pressure chamber connected to said tank, an air pipe communicating with the chamber, a delivery pipe connecting the chamber with the filling machine supply pipe, valves in the connection between the tank and chamber, in the delivery pipe and in the air pipe, a rod connected to all of said valves, and a lever connected to said rod for operating all of the valves simultaneously.

2. The combination of a pressure bottling system comprising a liquid supply vat, a filling machine, a supply pipe connecting the vat to the filling machine, a pressure chamber to receive waste liquid from broken and defective bottles and having an outlet at the bottom thereof, a ball valve within the chamber for said outlet, a valved delivery pipe connected to the outlet and to the pressure bottling system, and means for discharging the liquid from the chamber through the outlet and delivery pipe into the bottling system.

3. The combination of a liquid receiving tank, a pressure chamber having an outlet at the bottom thereof, a pipe connecting the tank with the chamber and extending down in the chamber adjacent to the bottom thereof, a valve in said pipe, a ball valve within the chamber for said outlet, a delivery pipe connected to the outlet, a valve in said delivery pipe, an air pipe connected to the chamber, a three-way valve in said air pipe having one port to exhaust to the atmosphere while the pipe connecting the tank and chamber is open, a rod connected to the valves in the pipe connecting the tank and chamber, in the delivery pipe and in the air pipe, and a lever connected to said rod for operating the valves simultaneously, substantially as described.

FRANK C. H. STRASBURGER.

Witnesses:
M. A. KIDDIE,
PAUL L. SCHMECHEL.